G. MATTA.
ANTIFRICTION BEARING.
APPLICATION FILED JUNE 15, 1908.
913,529.
Patented Feb. 23, 1909.
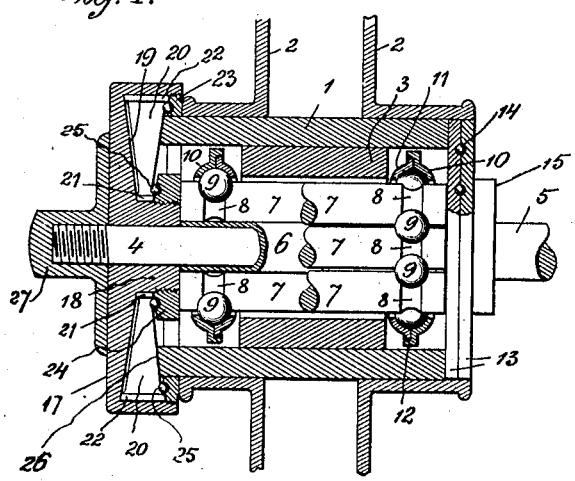
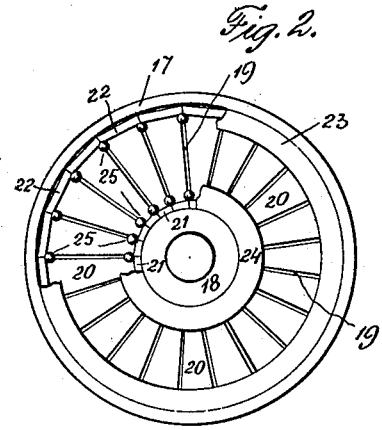
Witnesses
A. H. Rabsag,
R. H. Butler
Inventor
G. MATTA
By N. C. Everitt
Attorneys

UNITED STATES PATENT OFFICE.

GEORGE MATTA, OF BRADDOCK, PENNSYLVANIA.

ANTIFRICTION-BEARING.

No. 913,529.　　　Specification of Letters Patent.　　　Patented Feb. 23, 1909.

Application filed June 15, 1908. Serial No. 438,540.

*To all whom it may concern:*

Be it known that I, GEORGE MATTA, a subject of the King of Hungary, residing at Braddock, in the county of Allegheny and State of Pennsylvania, have invented certain new and useful Improvements in Anti-friction-Bearings, of which the following is a specification, reference being had therein to the accompanying drawing.

This invention relates to anti-frictional bearings, and the primary object of my invention is to provide positive and reliable means in connection with a bearing for reducing the friction thereof to a minimum, without sacrificing strength and durability.

Another object of the invention is to utilize rollers and balls for contacting bearing surfaces, said rollers and balls being arranged to provide a simple and durable structure having elements easily and quickly assembled.

A further object of the invention is to provide a bearing that can be economically and advantageously used in connection with vehicles, although the same is applicable to various kinds of machinery.

With the above and other objects in view, which will readily appear as the invention is better understood, the same consists in the novel construction, combination and arrangement of parts to be hereinafter described and then specifically pointed out in the appended claims.

In the drawings, Figure 1 is a longitudinal sectional view of a bearing constructed in accordance with my invention, Fig. 2 is a side elevation of a detached housing forming a part of the bearing, said housing being partly broken away.

In the accompanying drawings 1 designates a cylindrical hub or casing upon which is mounted cylindrical spoke or web supporting members 2. In the hub 1 intermediate the ends thereof is mounted a cylindrical partition 3, and extending longitudinally through said partition and the hub 1 is a spindle 4 of an axle 5. Revolubly mounted upon the spindle 4 is a sleeve 6.

Circumferentially of the sleeve 6 and bearing directly thereon are a plurality of rollers 7 of a less length than the hub 1 and corresponding in length to the sleeve 6. Each roller adjacent to the end thereof is provided with a ball race or annular groove 8 for anti-frictional balls 9, said balls being retained within the races 8 by sectional semi-cylindrical casings, each casing comprising sections 10 and 11, the section 11 being threaded within the section 10, as at 12.

The inner end of the hub 1 is closed by two plates 13 having anti-friction balls 14 arranged therebetween. These plates are interposed between the ends of the rollers 7 and a collar 15 mounted upon the axle 5. The opposite end of the hub is closed by a housing 17 mounted upon the hub 1 and the spindle 4 of the axle. The housing 17 is formed with a central sleeve 18 and with a conical bearing surface 19 for a plurality of circumferentially arranged conical rollers 20 having contacting collars 21 and 22. The conical rollers are retained in position by interior rings 23 and 24, the former being threaded in the housing and the latter threaded upon the sleeve 18 within the housing. Interposed between the rings 23 and 24 and the conical rollers 20 are anti-friction balls 25.

By reference to Fig. 1 of the drawings it will be observed that the outer end of the hub 1 is beveled at 26 and contacts with the conical rollers 20 to receive and reduce the friction set up by an end-thrust action.

The housing 17 is retained in position by a cap or nut 27 threaded upon the outer end of the axle spindle 4.

It is apparent from the novel construction of my bearings that I have devised a hub that can be readily used for the wheels of heavy vehicles particularly those for conveying heavy loads. The wearing parts of the hub are made of hardened steel and with the use of a suitable lubricant, the various elements of my bearing insure easy running.

While in the drawing forming a part of this application there is illustrated the preferred embodiments of my invention, it is to be understood that the elements therein can be varied or changed as to shape, proportion and exact manner of assemblage without departing from the spirit of the invention.

Having now described my invention what I claim as new, is;—

1. In an anti-friction bearing, the combination with an axle spindle, a cylindrical hub surrounding said spindle, plates closing the inner end of said hub, anti-friction balls arranged between said plates, a housing fitting upon the end of said spindle and said hub and provided with an inwardly extending sleeve formed with peripheral threads, said housing further provided with interior threads, circumferentially arranged conical rollers within said housing for engaging the end of said hub, peripherally threaded rings engaging with the threads of the sleeve and the threads of the housing whereby said rings are connected to the housing, anti-friction balls interposed between said rings and said conical rollers, and means for retaining said housing upon said spindle and said hub.

2. In an anti-friction bearing, the combination with a spindle, of a hub surrounding said spindle, plates for closing the inner end of said hub, a housing fitting provided with an inwardly extending sleeve fitted upon the outer end of said hub and upon said spindle, said sleeve provided with peripheral threads and said housing having interiorly arranged threads, circumferentially arranged conical rollers within said housing for bearing upon the outer end of said hub, means engaging with the threads of the sleeve and threads of the housing and provided with grooves to constitute ball races, balls mounted in said races and engaging the rollers, and means for retaining said conical rollers within said housing.

3. In an anti-friction bearing, the combination with a spindle, of a cylindrical hub surrounding said spindle, said hub having one end beveled, a housing fitting upon the outer end of said hub and said spindle, conical rollers arranged in the housing for bearing against the beveled end of said hub, and means bearing against the other end of the hub for retaining said housing upon the hub, and means for closing the inner end of the hub.

4. In an anti-friction bearing, the combination with a spindle, of a cylindrical hub surrounding said spindle, a housing fitting upon the outer end of said hub and provided with an inwardly projecting sleeve fitted upon said spindle, conical rollers arranged in said housing for bearing against said hub, bearing means carried by the sleeve and engaging the inner ends of said rollers, and means for closing the inner end of said hub.

5. In an anti-friction bearing, the combination with a spindle, of a hub inclosing said spindle, said hub having one end beveled and constituting a bearing, a housing fitting upon said hub, and radially extending conical rollers arranged therein for bearing upon the beveled end of said hub, and bearing means for the rollers carried by the hub.

In testimony whereof I affix my signature in the presence of two witnesses.

GEORGE MATTA.

Witnesses.
A. H. RABSOIG,
MAX H. SROLOVITZ.